Oct. 25, 1955  J. A. AXELSSON  2,721,744
CHUCKS
Filed Feb. 9, 1953  2 Sheets-Sheet 1

INVENTOR:
JOHAN A. AXELSSON
By: Young, Emery & Thompson
Attys.

Oct. 25, 1955  J. A. AXELSSON  2,721,744
CHUCKS
Filed Feb. 9, 1953  2 Sheets-Sheet 2
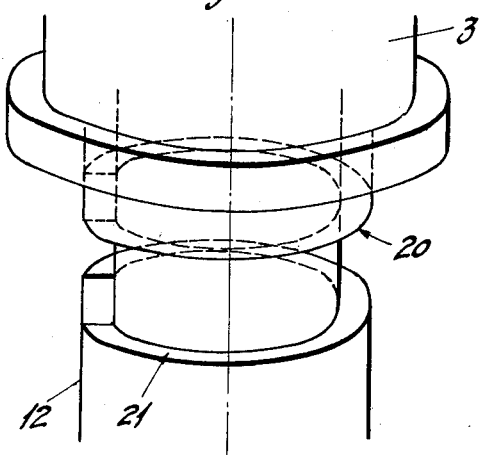
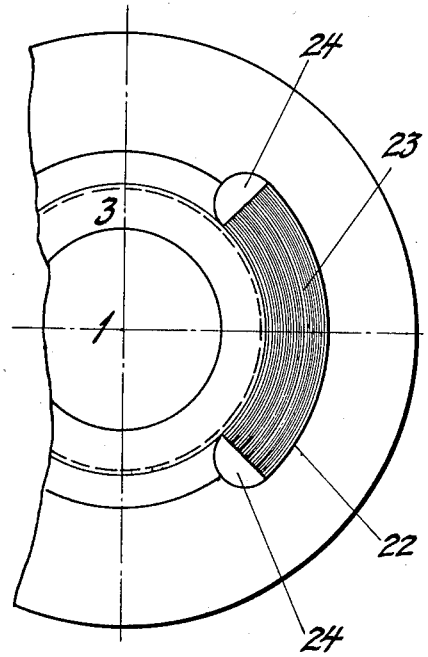
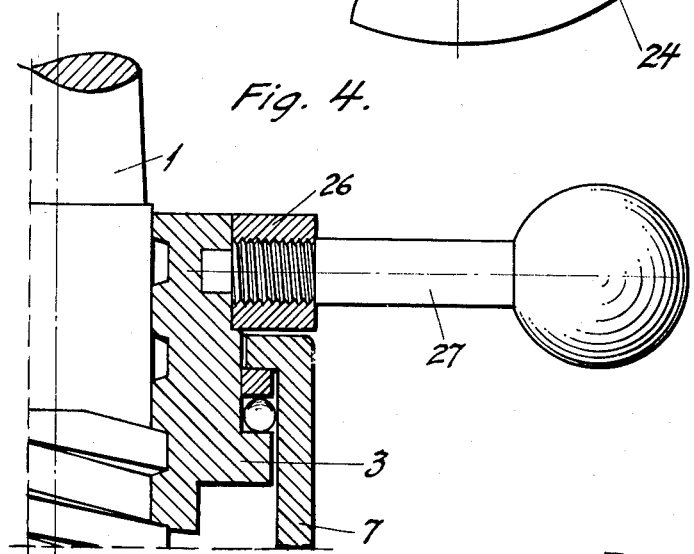
INVENTOR:
JOHAN ARVID AXELSSON
By: Young, Emery & Thompson
Attys.

United States Patent Office 2,721,744
Patented Oct. 25, 1955

2,721,744
CHUCKS

Johan Arvid Axelsson, Torshalla, Sweden, assignor to Aktiebolaget Fr. Ramström, Stockholm, Sweden, a corporation of Sweden Application February 9, 1953, Serial No. 335,807

8 Claims. (Cl. 279—58)

This invention relates to chucks of the type which comprises a spindle having a left-hand thread on which is disposed a nut carrying a sleeve having a conical end portion lodging a number of jaws in engagement with the lower end of said spindle, said nut being acted on by a spring adapted to urge the same in such a sense on said spindle as to cause said sleeve to move said jaws towards each other, a separation of said jaws being enabled, while the chuck is being rotated, by subjecting said nut to a braking action.

The invention has for its object to provide an improved chuck of the afore-mentioned type.

Since the central spindle has a left-hand thread, the tangential forces arising in the operation of the chuck due to the resistance opposed to the tool, e. g. a drill, tend to rotate the sleeve and nut in a direction such as to cause the tool to be loosened, and consequently it has been necessary to introduce various more or less complicated devices in order to counter-act this tendency.

According to the present invention the disadvantages above referred to are avoided by the fact that the nut and the sleeve do not form a rigid unitary structure, the sleeve being rotatably associated with the nut and at the same time being displaceably but not-rotatably connected with the spindle, whereby the sleeve will always rotate at the same speed as the spindle and, upon rotating the nut about the spindle, the sleeve will only be longitudinally displaced on the latter. Tangential forces acting on the jaws, therefore, will not be able to rotate the nut on the spindle.

This arrangement involves the additional advantage that, upon opening and closing the chuck, the jaws need not slip against the sleeve, such slip being apt to move the jaws out of their correct position.

The invention will now be described more in detail in conjunction with the accompanying drawings in which:

Fig. 2 is a perspective view of the formation of the co-operating abutment surfaces on the nut and the spindle for preventing jamming of the nut.

Fig. 3 is a plan view, partly broken away, of the chuck with an end nut removed.

Fig. 4 illustrates a modified embodiment.

Figure 1:
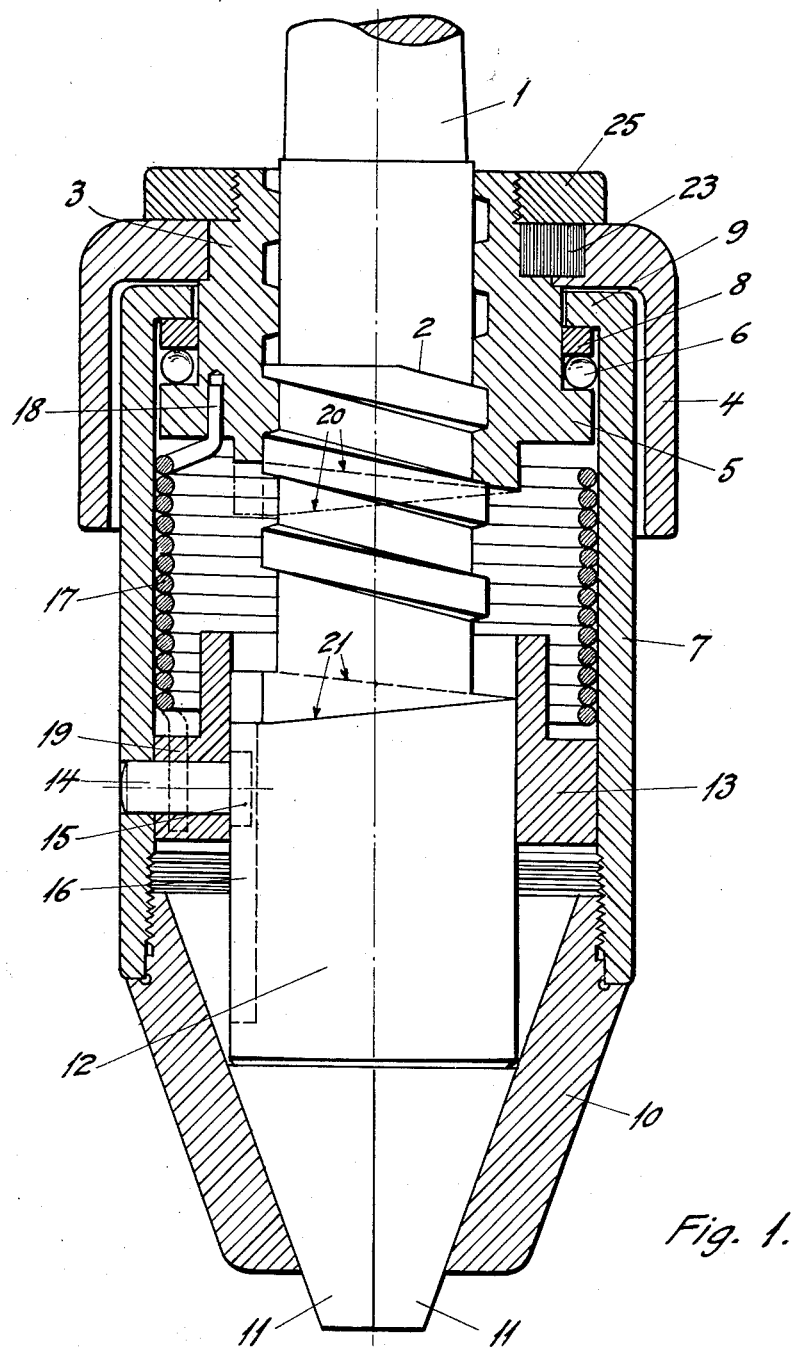
Fig. 1 is an axial section through the chuck according to one embodiment of the invention.

Referring to Fig. 1, numeral 1 designates a central spindle having a left-hand thread 2 onto which a nut 3 is screwed. An operating skirt or ring 4 is associated with the nut 3.

On an exterior flange 5 of the nut 3 a chuck sleeve 7 is suspended through the intermediary of a series of balls 6. The balls 6 are adapted to roll on the flange 5, and on the balls a steel ring 8 is slidingly disposed upon which ring an inwardly extending flange 9 of the chuck sleeve 7 is supported.

A frusto-conical sleeve 10 is screwed into the lower end of the chuck sleeve 7 and surrounds a set of clamping jaws 11 which are exteriorly cone-shaped and are adapted to clamp a tool, such as a drill, or a work piece. The jaws 11, in a manner known per se, are acted on by springs (not shown) which urge the jaws radially into engagement with the interior wall of the frusto-conical sleeve 10.

The lower portion of the spindle 1 is in the form of a cylindrical head 12 of a somewhat larger diameter than the remainder of the spindle. The cylindrical head 12 is guided by a ring 13 which is inserted in the chuck sleeve 7 and secured thereto by a pin 14. The pin 14 is provided at its inner end with a head 15 which engages a longitudinal slot 16 provided in the cylindrical head 12 whereby the chuck sleeve 7 is non-rotatably but longitudinally displaceably connected with the spindle 1.

A helical spring 17 surrounding the spindle 1 is anchored at one end 18 in the nut 3 and at the other end 19 in the ring 13.

If the chuck is mounted in a machine and is rotated clockwise, as seen from above, and the operating ring 4 is manually braked, then the nut 3 associated with said ring will be screwed in a downward direction on the spindle 1 causing the chuck sleeve 7 with its frusto-conical end piece 10 also to be moved downwardly. This results in the jaws 11 being moved apart by their springs enabling a tool or work piece to be inserted between the jaws.

When the nut 3 is screwed downward on the spindle 1 the helical spring 17 is tensioned. As stated above and as appears from Fig. 1, one end 18 of the helical spring 17 is connected to the nut 3, the other end 19 being connected to the ring 13 which, in turn, is connected to the sleeve 7. The sleeve 7 is nonrotatably but axially displaceably connected to the spindle 1 by means of the pin and slot connection 15, 16. Moreover, the sleeve 7 is rotatably carried by the nut 3. If now the nut is rotated on the thread 2, the upper end 18 of the spring 17 will move together with the nut around the spindle, whereas the lower end 19 of the spring is held fast by the ring 13 which due to the pin and slot connection 15, 16 cannot rotate relatively to the spindle. The spring will thus be put under tension. When, after having introduced the tool or work piece between the jaws 11, the operating ring 4 is released the spring 17 causes the nut 3 to be screwed upward along the spindle 1 whereby the chuck sleeve 7 with its frusto-conical end portion 10 also are moved upward clamping the jaws 11 about the tool or work piece so that the latter will be gripped and retained securely.

In order to enable the spring 17 to exert an adequate clamping pressure, the pitch of the thread 2 should not be too high. In practical applications it has been found most suitable to employ a thread pitch of a value slightly less than that at which the thread is just self-checking.

In this case, in order to prevent the nut 3, upon being screwed downwardly to its bottom position by braking of the operating ring 4, from being jammed against the spindle 1, the nut and the spindle, according to the present invention, are provided with abutment surfaces preventing such jamming action. The said surfaces could consist of pins or the like projecting substantially axially from the two members and defining the bottom position of the nut, however, in order to damp the shock which occurs it is preferable to provide the abutment surfaces in the form of helically extending faces the pitch of which is oppositely handed relative to that of the spindle thread 2, i. e. such that said faces form right-hand threads. This arrangement is illustrated in Fig. 2 in which the nut 3 is formed at its bottom end with a helically extending face 20 which, in the lowermost position of the nut, will engage a corresponding helically extending face 21 formed at the upper end of the cylindrical head 12. Owing to the fact that said faces are oppositely pitched relative to the spindle thread 2 any jamming of the nut in its bottom position will be prevented, so that the nut will always be screwed upwardly along the spindle 1 by the spring 17 as soon as the operating ring 4 is released. It will be understood that the faces 20 and 21 need not extend throughout the circumference of the nut 3 and head 12, respectively, but may also be formed so as to extend along a smaller part thereof.

In order to soften the shock transmitted to the hand by which the operating ring 4 is braked, when the face 20 of the nut 3 impinges the face 21 of the cylindrical head 12, the operating ring 4, as will be seen from Figs. 1 and 3, may be connected with the nut 3 by an elastically yielding member. For this purpose, a peripheral recess 22 may be formed partly in the nut 3 and partly in the operating ring 4, said recess receiving a rubber member 23 the ends of which abut against end inserts 24 of steel disposed in said recess. When, upon the operating ring 4 being braked, the nut 3 impinges the cylindrical head 12 of the spindle 1 the shock will be elastically absorbed by the rubber member 23 which will be compressed between the steel inserts 24, the latter preventing at the same time any damage to the rubber member through the shearing action thereon. Numeral 25 in Fig. 1 designates an end nut (not shown) in Fig. 3.

It will be understood that the rubber member 23 might be replaced by a spring.

The chuck could also, to advantage, be employed, for instance, in the tailstock or turret of a lathe. In this case, in order to facilitate replacement of the tool when the chuck is not rotating, it will be possible, as will appear from Fig. 4, to replace the operating ring 4 by a ring 26 rigidly connected with the nut 3 and having secured thereto a suitable number of levers 27. This arrangement will also enable the chuck to be tensioned in excess of the maximum power of the spring.

What I claim is:

1. In a quick-change chuck, a central spindle provided with a left-hand thread, a nut mounted on said thread, a sleeve provided with a conical end portion surrounding the end of said spindle, said sleeve being rotatably carried by said nut and being non-rotatably but axially displaceably connected to the spindle, a number of chuck jaws arranged in the conical end portion of the sleeve with their ends engaging the end surface of the spindle, and a helical spring interconnecting said nut and said sleeve tending to rotate the nut anti-clockwise as viewed from the end of the spindle so as to move the sleeve axially in a direction for closing the chuck jaws, a braking action exerted on said nut when the chuck rotates causing said nut to be rotated in the opposite direction and the sleeve to be moved axially in a direction for separating the chuck jaws.

2. In a quick-change chuck, a central spindle provided with a left-hand thread, a nut mounted on said thread, said nut being provided with an outer flange carrying a row of balls, a sleeve provided at one end with an inner flange supported on said row of balls and at the other end with a conical portion surrounding the end of said spindle, said sleeve being rotatably carried by said nut and being non-rotatably but axially displaceably connected to the spindle, a number of chuck jaws arranged in the conical end portion of the sleeve with their ends engaging the end surface of the spindle, and a helical spring interconnecting said nut and said sleeve tending to rotate the nut anti-clockwise as viewed from the end of the spindle so as to move the sleeve axially in a direction for closing the chuck jaws, a braking action exerted on said nut when the chuck rotates causing said nut to be rotated in the opposite direction and the sleeve to be moved axially in a direction for separating the chuck jaws.

3. In a quick-change chuck, a central spindle provided with a left-hand thread, a nut mounted on said thread, a sleeve provided with a conical end portion surrounding the end of said spindle, the spindle and the sleeve being interconnected by means of a pin carried by one of said members and a slot in the other member which slot the pin engages, said pin and slot connection preventing relative rotational movement but permitting relative axial movement between the said members, and a helical spring interconnecting said nut and said sleeve and tending to rotate said nut anti-clockwise as viewed from the end of the spindle so as to move the sleeve axially in a direction for closing the chuck jaws, a braking action exerted upon the nut when the chuck rotates causing said nut to be rotated in the opposite direction and the sleeve to be moved axially in a direction for separating the chuck jaws.

4. In a quick-change chuck, a central spindle having a left-hand thread and provided with a cylindrical head of larger diameter at its end, the opposed surfaces of said nut and said cylindrical head being formed as helical surfaces of a pitch opposite that of the thread on the spindle, a sleeve provided with a conical end portion surrounding the end of the spindle, said sleeve being rotatably carried by said nut and being non-rotatably but axially displaceably connected to said spindle, a ring-shaped member within said sleeve for guiding said cylindrical head, a number of chuck jaws arranged in the conical end portion of the sleeve with their ends engaging the end surface of said cylindrical head, and a helical spring interconnecting said nut and said sleeve and tending to rotate the nut anti-clockwise as viewed from the end of the spindle so as to move the sleeve axially in a direction for closing the chuck jaws, a braking action exerted on said nut when the chuck rotates causing said nut to be rotated in the opposite direction until such rotation is gently stopped by the helical surface on the nut engaging the helical surface on said cylindrical head, said rotation of the nut causing the sleeve to be moved axially on the spindle in a direction for separating the chuck jaws.

5. In a quick-change chuck, a central spindle provided with a left-hand thread, a nut mounted on said thread, a sleeve provided with a conical end portion surrounding the end of said spindle, said sleeve being rotatably carried by said nut and non-rotatably but axially displaceably connected to said spindle, a ring-shaped operating member connected to said nut, a number of chuck jaws arranged in the conical end portion of said sleeve with their ends engaging the end of said spindle, and a helical spring interconnecting said nut and said sleeve and tending to rotate the nut anti-clockwise as viewed from the end of the spindle so as to move the sleeve axially in a direction for closing the chuck jaws, a braking action exerted on the nut by means of said operating member when the chuck rotates causing said nut to be rotated in the opposite direction and the sleeve to be moved in a direction for separating the chuck jaws.

6. In a quick-change chuck, a central spindle provided with a left-hand thread, a nut mounted on said thread, a sleeve provided with a conical end portion surrounding the end of said spindle, said sleeve being rotatably carried by said nut and non-rotatably but axially displaceably connected to said spindle, a ring-shaped operating member turnably mounted on said nut, an elastic member interposed between said nut and said operating member limiting relative turning movement between the same, a number of chuck jaws arranged in the conical end portion of said sleeve with their ends engaging the end of said spindle, and a helical spring interconnecting said nut and said sleeve and tending to rotate the nut anti-clockwise as viewed from the end of the spindle so as to move the sleeve axially in a direction for closing the chuck jaws, a braking action exerted on the nut by means of said operating member when the chuck rotates causing said nut to be rotated in the opposite direction and the sleeve to be moved in a direction for separating the chuck jaws.

7. A quick-change chuck as claimed in claim 6, wherein the elastic member is arranged in a cavity formed by opposed recesses in the outer periphery of the nut and the inner periphery of the ring-shaped operating member.

8. A quick-change chuck as claimed in claim 5, wherein the ring-shaped operating member is provided with at least one projecting lever for facilitating rotation of said nut when the chuck is non-rotating.

References Cited in the file of this patent

UNITED STATES PATENTS

| | | |
|---|---|---|
| 1,225,089 | Weir | May 8, 1917 |
| 2,458,824 | Axelsson | Jan. 11, 1949 |